United States Patent

Brosset et al.

[11] Patent Number: 5,852,644
[45] Date of Patent: Dec. 22, 1998

[54] GUIDE TUBE FOR A NUCLEAR FUEL ASSEMBLY

[75] Inventors: Alain Brosset, Fontaines Saint Martin; Michel Verdier, Lyons, both of France

[73] Assignees: Framatome, Courbevoie; Compagnie Generale des Matières Nucléaires, Velizy-Villacoublay, both of France

[21] Appl. No.: 884,323

[22] Filed: Jun. 27, 1997

[30] Foreign Application Priority Data

Jun. 28, 1996 [FR] France .................................. 96 08092

[51] Int. Cl.⁶ ........................................................ G21C 3/32
[52] U.S. Cl. ........................ 376/353; 376/449; 376/234
[58] Field of Search .................... 376/449, 353, 376/234

[56] References Cited

U.S. PATENT DOCUMENTS

| | | | |
|---|---|---|---|
| 3,791,466 | 2/1974 | Patterson et al. | 376/449 |
| 3,801,453 | 4/1974 | Jones | 376/449 |
| 4,668,469 | 5/1987 | Widener | 376/353 |
| 5,068,083 | 11/1991 | John, Jr. et al. | 376/449 |
| 5,343,508 | 8/1994 | Hatfield | 376/449 |
| 5,606,583 | 2/1997 | Verdier | 376/234 |

FOREIGN PATENT DOCUMENTS 2539548  7/1984  France .

Primary Examiner—Daniel D. Wasil
Attorney, Agent, or Firm—Pollock, Vande Sande & Amernick

[57] ABSTRACT

A control rod guide tube for a nuclear reactor fuel assembly consists of several mutually portions of zirconium-based alloy. They define a passage that is narrow in a bottom portion of the tube. The guide includes a top length extending over at least 70% of its total length, and a bottom length of thickness greater than that of the top length. The top of the bottom length is engaged in the top length and is welded to the top length along the terminal edge of the top length.

11 Claims, 1 Drawing Sheet

U.S. Patent Dec. 22, 1998 5,852,644
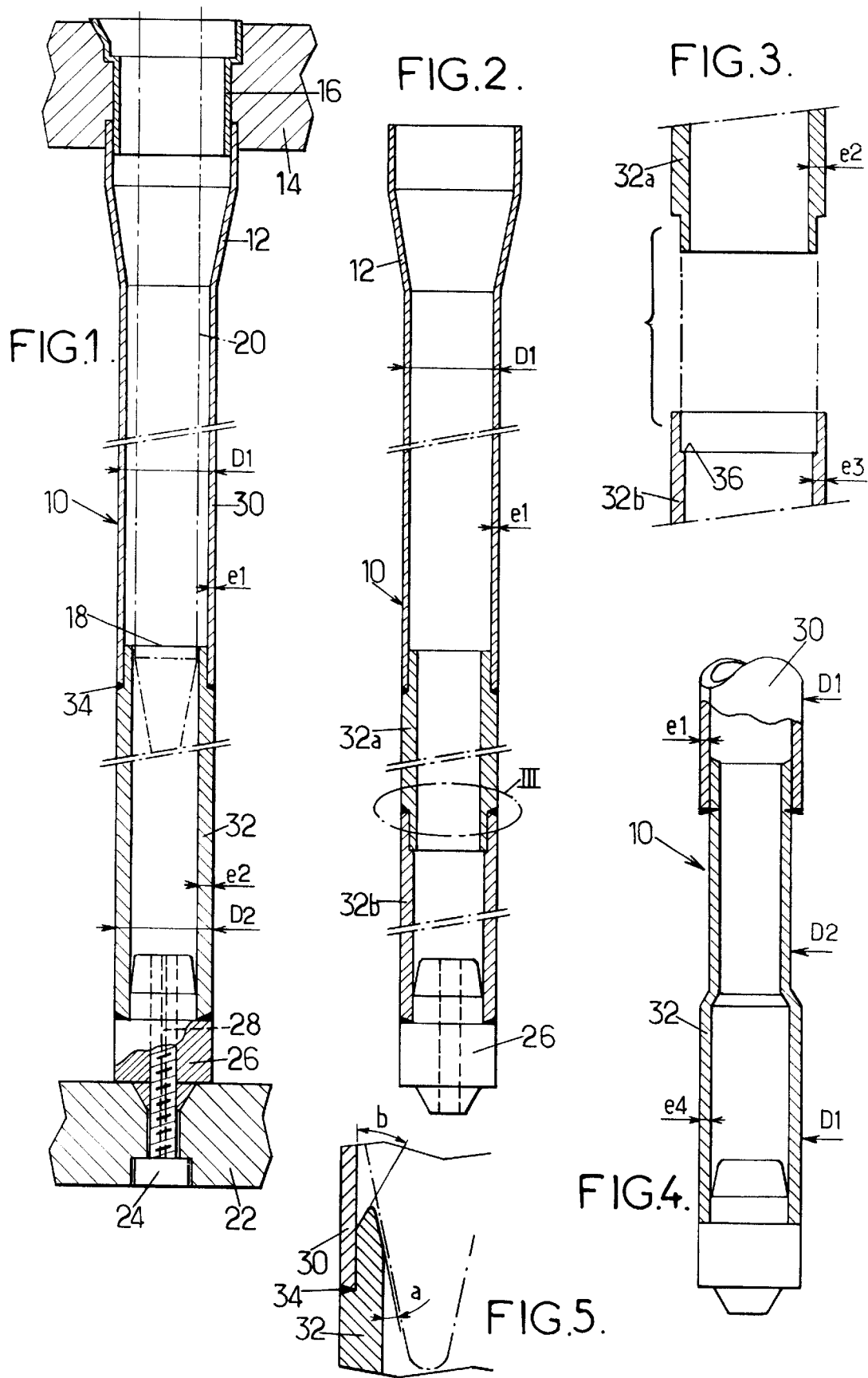

GUIDE TUBE FOR A NUCLEAR FUEL ASSEMBLY

BACKGROUND OF THE INVENTION

The present invention relates to control rod guide tubes suitable to be incorporated in the skeleton of a nuclear fuel assembly.

Fuel assemblies commonly used in pressurized water reactors include two end nozzles interconnected by guide tubes of zirconium-based alloy. Typically, grids for holding fuel rods in a regular array are carried by the guide tube. At least some of the guide tubes of assemblies placed in a reactor are designed to receive the rods of control clusters. Conventionally, the bottom portions of such guide tubes have respective constricted zones for slowing down the fall of the cluster at the end of displacement thereof by throttling the flow of coolant expelled by each rod between the rod and the constricted zone, which leaves only a small amount of clearance between the rod and the wall of the guide tube.

This bottom portion is subjected to a high level of stress in the event of a cluster falling, because of the hydraulic pressure that then appears. It is also subjected to stress in the event of transient phenomena that cause the assembly to be raised and then to fall back. While falling back, the inertia of the assembly may cause overall deformation of the assembly and/or to buckling of the weakened portions of the tubes, thereby impeding free passage of the rods of the control cluster.

Various guide tubes having a reinforced base portion have already been proposed. For example, U.S. Pat. No. 5,068,083 describes a control rod guide tube for a nuclear reactor fuel assembly made up of a plurality of welded-together parts of zirconium-based alloy defining a passage which is narrower in a bottom portion of the tube. The bottom portion of the guide tube is shrunk to constitute the narrow portion, and it is surrounded by a welded sleeve. That solution suffers in particular from the drawback of being complex to manufacture, with the risk of mechanical stresses appearing.

French Patent No. 93 15826 describes a solid tube having a constant outside diameter and an increased wall thickness in its bottom portion. The tube has mechanical and hydraulic properties that are highly favorable, but it requires special tooling for manufacture thereof.

SUMMARY OF THE INVENTION

An object of the present invention is to provide an improved guide tube for a fuel assembly. It is a more particular object to provide a guide tube which is simple to manufacture while reducing the risks of local collapse.

To this end, there is provided a guide tube including a top length extending over at least 70% of its overall length and a bottom length of thickness greater than that of the top length, engaged at its own top end in a terminal fraction of the top length and welded thereto along the terminal edge of the top length.

In a particular embodiment, the tube is of constant diameter over its entire running portion. This result can be achieved in several different ways. A first solution consists in giving the bottom length an outside diameter that is constant and equal to the outside diameter of the top length, except in said top portion which has a smaller outside diameter, equal to the inside diameter of the top length. The bottom length can then be a single piece. It may also be constituted by a top piece and a bottom piece, the top piece engaging in the top length and also engaging in the bottom piece to which it is welded along a shoulder on its outside surface.

If a discontinuity in the outside diameter of the running portion of the guide tube is acceptable, then another solution is possible. It consists in making up the single-piece bottom length of substantially constant thickness from a lower portion having the same outside diameter as the top length and a higher portion of diameter substantially equal to the bottom diameter of the top length.

The guide tube is usually closed by a bottom plug bearing against the bottom nozzle. This plug is generally formed with a calibrated throttling passage to allow coolant to pass. In general, the wall of the guide tube is also formed with openings to allow exit of coolant expelled by a rod moving down, while imposing a headloss that increases with the descent of the rod.

The invention will be better understood on reading the following description of particular embodiments, given by way of example.

BRIEF DESCRIPTION OF THE DRAWINGS

FIG. 1 shows the general structure of a guide tube constituting a first embodiment, together with the means for coupling the tube to the end nozzles of an assembly.

FIG. 2 is similar to FIG. 1 and only shows the guide tube of a second embodiment of the invention;

FIG. 3 is a schematic view, on a larger scale, showing detail III of FIG. 2, prior to the lengths being assembled and welded together.

FIG. 4 is similar to a portion of FIG. 2 and shows yet another embodiment; and

FIG. 5 is a detail view on a large scale showing a modification of FIG. 1.

DETAILED DESCRIPTION

The guide tube 10 shown in FIG. 1 has a running portion of constant diameter. This running portion is extended upwards, in the example shown, by a terminal zone 12 of enlarged diameter for connection to the top nozzle 14. Fixing can be performed by screwing and locking a bush 16. Coolant expelled upwardly by a rod 20 moving down along the tube is subjected to headloss which increases considerably when the rod moves past the junction 18 between the top length and the smaller-diameter bottom length.

The foot of the tube 10 can be fixed to a bottom nozzle 22 by means of a screw 24 which engages in a terminal plug 26 of the rod. The plug is welded to the running portion of the tube. In general, a calibrated outlet passage 28 is provided for the coolant through the screw. Also, openings (not shown) can be distributed along the tube.

The tube 10 shown in FIG. 1 is made up of two lengths that are welded together. The top length 30 is cylindrical. It has a constant diameter D1 with the exception of the enlarged terminal zone 12, and it has a constant wall thickness e1. It extends over a height representing at least 70% and often about 80% of the total length of the tube 10. The bottom length 32 has the same outside diameter D2, equal to D1, over its entire length. Its thickness e2 is considerably greater than e1, typically about twice thickness e1. Thus, the diametrical clearance between the rod 20 and the tube 10 becomes smaller as soon as the rod enters the length 32 as it moves downwards.

The length 32 is fixed to the length 30 by mutual engagement and by welding. For this purpose, the top portion of the bottom length 32 has an outside diameter that is smaller by 2e1, over a length of several millimeters. The top length 30 bears against the shoulder formed in this way and it is welded at 34 along its end edge. This structure removes the need for through-welding.

By way of example, a 3880 mm long guide tube whose top length constitutes about 85% of the total length thereof has been made out of zirconium alloy with D1=D2=12.45 mm, e1=0.5 mm, and e2=1.2 mm. The thickness of the extension of reduced diameter of the bottom length was then e1−e2=0.7 mm; this has been found sufficient for satisfactory engagement.

The embodiment of FIG. 2 (in which elements corresponding to those of FIG. 1 are designated by the same references), differs from that of FIG. 1 in that the bottom length is constituted by a higher part 32a and a lower part 32b. The higher part 32a is fixed to the top length 12 in the same manner as in FIG. 1. The thickness e3 of the lower part 32b is intermediate between e1 and e2. It is of smaller thickness in a terminal zone so as to constitute an internal shoulder 36 (FIG. 3). The bottom terminal zone of the higher part 32a is of smaller thickness so as to constitute an external shoulder against which the lower part 32b bears. Parts 32a and 32b are welded together in the same manner as the two lengths are welded together.

The lower part 32b is generally much shorter than the higher part 32a. Its presence serves to reduce the stress during the final portion of the descent of a rod, since it leaves clearance that is greater than that left in the higher part: by way of example, it is possible to adopt e3=0.9 mm when e2=1.2 mm.

In the embodiment shown on FIG. 4, the bottom length 32 is a single piece of constant thickness, as in FIG. 1. Its thickness e4 is greater than the thickness e1 of the top length 30. It comprises a lower part having the same outside diameter as the top length 30 and a higher part having a diameter D2 that is substantially equal to the inside diameter of the top length, for enabling connection. The higher part can be constituted by swaging, using conventional manufacturing techniques. This structure makes it possible to avoid any operation for local thinning. Nevertheless it does not make it possible to adopt a thickness e4 that is as great as e2 in the example shown in FIG. 1, since the crimping results in a reduction of the radial clearance by at least e4. In practice, for a guide tube in which it would have been possible to adopt e2=1.2 mm, it will be necessary to adopt e4 of about 0.7 mm, for a thickness e1 of 0.5 mm.

In the modified embodiment of FIG. 5, where elements corresponding to those of FIG. 1 are given the same reference numerals, the higher portion of the bottom length 32 has a radially outer chamfer and a radially inner chamfer. The outer chamfer is substantially conical in shape; it extends over a fraction of the higher part. It facilitates engagement of the higher part in the top length prior to welding. It will often have a slope b of about 30°. The inner chamfer, which is generally longer, has a slope a of the same order as that of the terminal portion of the control rod that it is to receive. In practice, an angle of about 15° is close to optimum. The two chamfers do not meet, thereby leaving an end zone that is plane or rounded.

We claim:

1. A control rod guide tube for a nuclear reactor fuel assembly, said guide tube comprising:
   a running portion including a top length extending over at least 70% of a total length of said guide tube and having a predetermined thickness; and
   a bottom length having a thickness greater than the thickness of the top length;
   said bottom length having an upper part engaged in a terminal lower fraction of said top length and being welded to said top length along a terminal edge of said top length;
   said bottom length defining an inner flow passage having a smaller diameter than an inner flow passage in said top length; and
   a bottom plug welded to said bottom length, projecting into said bottom length and formed with a passage for a connecting screw.

2. A guide tube according to claim 1, wherein said bottom length has a constant outside diameter equal to an outside diameter of the top length except in an uppermost portion thereof which presents a smaller outside diameter, equal to the diameter of the inner flow passage in the top length.

3. A guide tube according to claim 2, wherein said bottom length is a single integral part.

4. A guide tube according to claim 2, wherein said bottom length consists of an upper section and a lower section, said upper section projects into said top length and into the lower section, and said upper section is welded to the lower section along a shoulder of said upper section.

5. A tube according to claim 4, wherein said lower section has an internal shoulder bearing against a lower edge of a terminal fraction of reduced outside diameter of the upper section.

6. A guide tube according to claim 4, wherein the lower section has a thickness intermediate between the thickness of the top length and that of upper section.

7. A tube according to claim 1, wherein said bottom length is a single piece, has a thickness that is substantially constant and is greater than the thickness of the top length and comprises a lower portion having an outside diameter equal to the outside diameter of the top length and a higher portion having an outside diameter that is substantially equal to an inside diameter of the top length and being partially engaged in said terminal lower fraction of said top length.

8. A tube according to claim 2, wherein said uppermost portion has an outside terminal chamfer and an inside terminal chamfer.

9. A tube according to claim 8, wherein said outside chamfer extends over a fraction only of an axial length of said uppermost portion.

10. A tube according to claim 9, wherein said internal chamfer has an axial length greater than an axial length of said external chamfer.

11. A control rod guide tube for a nuclear reactor fuel assembly, said guide tube comprising:
   a top length extending over at least 70% of a total length of said guide tube and having a predetermined thickness; and
   a bottom length having a thickness greater than the thickness of the top length;
   said bottom length having an upper part engaged in a terminal lower fraction of said top length and being welded to said top length along a terminal edge of said top length;
   said bottom length defining an inner flow passage having a smaller diameter than an inner flow passage in said top length, having a constant outside diameter equal to an outside diameter of the top length except in an uppermost portion thereof which presents a smaller outside diameter, equal to the diameter of the inner flow passage in the top length, and consisting of an upper section and a lower section, said upper section projecting into said top length and into the lower section, and said upper section being welded to the lower section along a shoulder of said upper section.

* * * * *